May 25, 1926.
T. S. MILLER
WINDING ENGINE
Filed Dec. 22, 1922
1,586,210
2 Sheets-Sheet 1
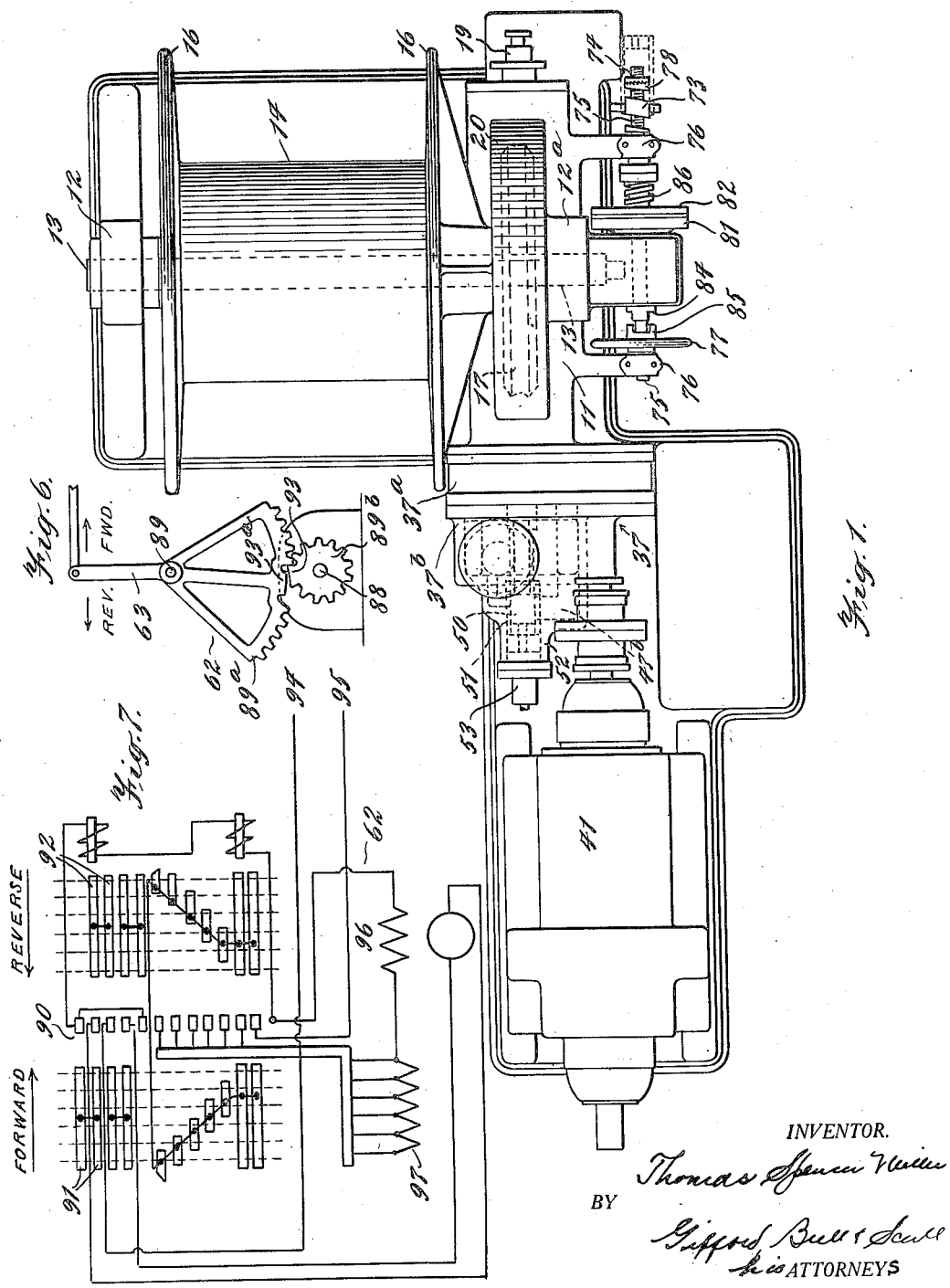

May 25, 1926. 1,586,210
T. S. MILLER
WINDING ENGINE
Filed Dec. 22, 1922 2 Sheets-Sheet 2
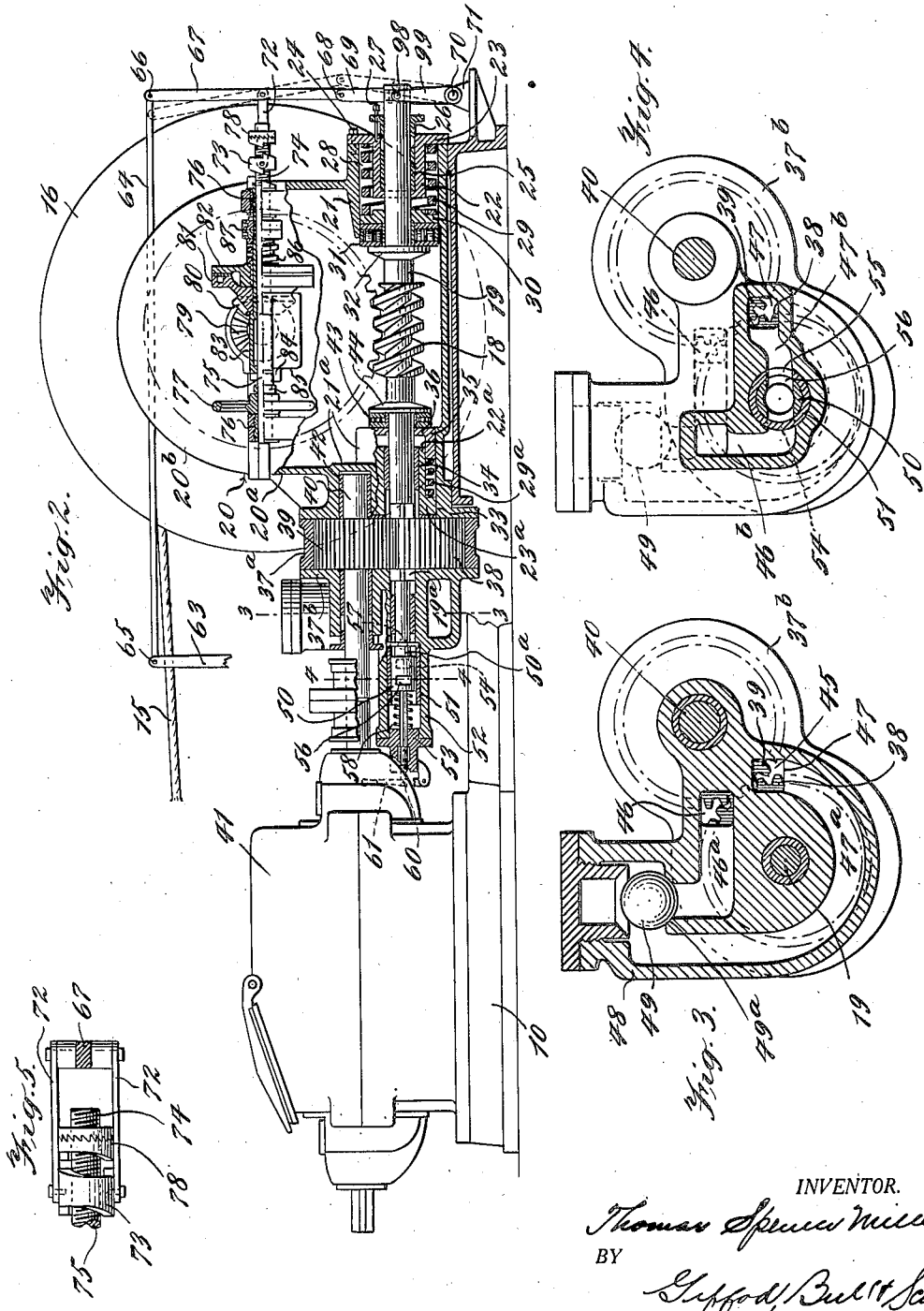
INVENTOR.
Thomas Spencer Miller
BY
Gifford Bull & Scull
his ATTORNEYS Patented May 25, 1926.

1,586,210

UNITED STATES PATENT OFFICE.

THOMAS SPENCER MILLER, OF SOUTH ORANGE, NEW JERSEY.

WINDING ENGINE.

Application filed December 22, 1922. Serial No. 608,512.

My invention more particularly relates to improvements in winding engines, in which are provided means for resisting and controlling the pull on the cable while permitting the drum to wind in the cable freely.

My invention consists of certain novel parts and combinations of parts particularly pointed out in the claims.

The following is a description of a winding engine embodying my invention in the form at present preferred by me but it will be understood that various modifications and changes may be made therein without departing from the spirit of my invention and without exceeding the scope of my claims.

My invention will best be understood by reference to the accompanying drawings, in which Figure 1 is a plan view of a towing engine embodying my invention; Fig. 2 is a side view thereof, partially in section, with the section through the oil brake taken diagonally; Fig. 3 is a cross section taken on the plane of the line 3—3 of Fig. 2; Fig. 4 is a cross section taken on the plane of the line 4—4 of Fig. 2; Fig. 5 is a detail plan view of certain parts shown in Fig. 1; Fig. 6 is an end view of the controller for the motor, and Fig. 7 is a diagrammatic view of the controller with the electrical connections therefor.

Referring to the drawings by reference characters, 10 indicates a bed frame or base for the engine provided with a standard 11 (Fig. 1), having a bearing at 12 for one end of the shaft 13 on which is mounted the drum 14, which receives the cable or hawser 15. A bearing for the opposite end of the shaft 13 is provided in the casing, as will directly appear. The drum 14 is provided with the usual end flanges 16. A worm wheel 17 is mounted on the shaft 13 and meshes with a worm 18 secured on a shaft 19, mounted in suitable bearings both for rotary and longitudinal movement. The worm 18 is preferably highly efficient; that is to say, the worm and worm wheel are so designed that tension on the cable may at times cause the worm wheel to rotate the worm. The worm wheel 17, worm 18 and associated parts, are housed in a casing, indicated, generally, at 20, and comprising a lower section 20ª and an upper section 20ᵇ. Said casing is provided at 12ª with a second bearing for the shaft 13. In the form shown, the casing is provided with a hollow boss 21 in which is arranged a bearing sleeve 22, surrounding the shaft 19 and provided at its outer end with a securing flange 23, through which pass securing bolts 24 (only one of which is shown in Fig. 2) which secure the flange to the boss 21. A suitable bushing 25 is interposed between the shaft and the sleeve 22, and arranged to permit packing between it and gland 26 secured by adjustable stud bolts 27 (only one of which is shown), passing through a flange on said gland and threaded into the outer end of the sleeve 22. The sleeve 22 is of a less diameter than that of the bore of the boss 21, so as to provide an annular space 28 surrounding said bearing sleeve, in which is received a spiral compression spring 29, one end of which engages the flange 23 of the sleeve 22 and the opposite end of which engages a collar or ring 30 surrounding the shaft 19 and fitting within the boss 21. A suitable antifriction thrust bearing 31 is interposed between the collar 30 and a collar 32 secured on the shaft 19. It will thus be seen that the spring 29 resists the movement of the shaft 19 to the right, as viewed in Fig. 2. The casing is also provided with a hub or boss 21ª formed with an opening 33 in alinement with the opening in the boss 21 and through which the shaft 19 passes. A sleeve 22ª is mounted within the boss 21ª and forms a second bearing for the shaft 19, a bushing 34 preferably being interposed between the shaft and the sleeve.

A spiral compression spring 29ª relatively light as compared with the spring 29, is interposed between the flange 23ª on the sleeve 22ª and a second sleeve 35 surrounding the sleeve 22ª and having a flange 36 at its end surrounding the shaft 19. The lower section 20ª of the housing is also provided with an extension, indicated, generally, at 37 (see Fig. 1), and preferably comprising two flanged sections 37ª and 37ᵇ, which are secured together and to the section 20ª as by bolts (not shown). Said extension 37 forms a casing or housing for spur gears 38 and 39, the gear 38 being mounted on a square section 19ª of the shaft 19, so that the spur gear rotates the shaft, but permits the shaft to move longitudinally therethrough. A second spur gear 39 is mounted on an extension 40 of the armature shaft of a motor 41, the shaft 40 having its bearings in the lower section 20ª of the casing and the extension 37 thereof, a suitable bushing 42 preferably being interposed between the shaft and the casing. An antifriction bearing 43 is interposed between the sleeve 35 and a collar 44 secured on the shaft 19.

The spur gears 38 and 39 serve not only to transmit motion from the motor 41 to the shaft 19 and the drum, but form part of a fluid brake, which will now be described. The teeth of the spur gears 38 and 39 as well as the ends of said gears just clear the casing or housing within which they are enclosed. While there is a slight clearance between the spur gears and the casing, the viscosity of the oil serves to make a tight joint. The space within which the spur gears are mounted forms part of a chamber, indicated generally at 45, which chamber is filled with a fluid, preferably oil, which forms part of the fluid brake and also lubricates the gears. Said chamber also comprises ports or passages 46 and 47 extending longitudinally of the extension casing 37 and communicating with the space enclosing the two gears at the two opposite sides of the engaging portions of the two gears as indicated in Fig. 3. The ports or passages 46 and 47 communicate with passages 46ª and 47ª formed in a valve head 48 and which lead to a valve, which is shown as comprising a ball 49 engaging a seat 49ª, so that the ball permits circulation of the oil or other fluid through the passages in one direction but serves to prevent flow in the opposite direction.

The spur gears thus constitute fluid propelling members.

When the gear 38 is rotated clockwise and the gear 39 anti-clockwise as viewed in Fig. 3, which is the direction they are rotated when the hawser or cable is being wound in, there is little or no braking resistance because the gears 38 and 39 carry the oil around to the port or passage 46 from which it flows through the passage 46ª lifting the ball 49, thence through the passage 47ª and the port or passage 47, to the gears on the opposite sides of their engaging portions. When the hawser is being wound in, therefore, the oil circulates with little or no resistance. When tension is placed on the cable, however, and the drum tends to rotate in a direction to rotate the spur gears 38 and 39 in the opposite direction, the spur gears tend to cause the oil or fluid to circulate in the opposite direction. The ball 49 then seats, thereby choking the oil and forming a braking action which resists the pull on the cable. The shaft 19 operates a piston valve member 50 which is preferably arranged in alinement therewith and moves longitudinally within a valve liner or shell 51, in turn, mounted in a cylindrical chamber 52 formed at the outer end of the extension 37, the outer end of said chamber being closed by a cap 53. The ports 46 and 47 which communicate with the space in which the gears 38 and 39 are mounted, extend beyond the braking valve member already described and communicate by passage 46ᵇ and 47ᵇ (Fig. 4), respectively, with ports 54 (Fig. 2) and 55 (Fig. 4), in opposite sides of the valve liner 51. The piston member 50 is provided with an opening 56 extending transversely therethrough and which, with the parts occupying their normal positions, as indicated in Fig. 2, is blanked. The port or opening 55 in the valve liner 51 is preferably long enough to overlap the opening 56 in the piston member, in either the open or closed position of the valve, but the opening 54 in the valve liner and which is on the opposite side from the opening 55, is not long enough to register with the piston valve opening 56 with the piston in its normal position, so that the latter is normally blanked. Furthermore, there is a considerable clearance between the port opening 54 of the valve liner and the opening 56 in the piston valve, as indicated in Fig. 2, so that the piston valve thereby can move through a considerable distance without bringing the opening therein into registry with the port opening 55. When the opening 56 is brought into registry with the two openings 54 and 55 in the valve liner, a by-pass for the oil is formed around the braking valve 49, so that the oil or other fluid may then circulate when the drum is overhauled and the spur gears rotate in a direction to cause the braking valve to be seated. A ball 57 is preferably seated in ball joints in the outer end of the shaft 19 and the inner end of the piston valve member 50 respectively, so as to permit rotation of the shaft 19 without rotation of the piston valve. The inner end of the piston valve member is preferably contracted, as at 50ª. A spring 58 is preferably interposed between the outer end of the piston valve member 50 and the cap 53 which tends to move the piston valve to the right, as viewed in Fig. 2. To the outer end of the piston valve member 50 is preferably connected a stem 59 extending through the cap 53 and pivoted at 60 to a hand lever 61 by which the piston valve member may be operated manually for a purpose which will hereinafter more fully appear.

The motor 41 is governed by a controller, indicated generally at 62 in Figs. 6 and 7. Said controller is actuated by an arm 63 which is, in turn, operated by a link 64, one end of which is pivoted at 65 to the end of the arm 63 and the opposite end of which is pivoted at 66 to the outer end of a floating lever 67. The opposite end of this lever is pivoted at 68 to an arm 69 mounted on a shaft 70 having its bearings in standards 71 on the bed frame. The floating lever 67 is pivoted at an intermediate point to strap or yoke members 72 the opposite ends of which are pivoted to a nut 73 engaging a threaded portion 74 of an operating shaft 75 having its bearings at 76 in the casing 20. A hand-wheel 77 is splined on the shaft 75 to rotate the same, and, at the same time, to move longitudinally thereof. A stop 78 is mounted on the shaft 75 on one side of the nut 73, the casing on the opposite side serving as a stop for said nut in the opposite direction. By rotating the hand-wheel 77, the shaft 75 is rotated and the nut 73 moved longitudinally to move the floating lever 67 about the pivot 68 and through the link connections 64, operate the controller.

Provision is also made in accordance with my invention for automatically operating the controller. The automatic mechanism, in the form illustrated, comprises a bevel gear 79 secured on the drum shaft 13 which engages a bevel gear 80 loose on the shaft 75, a friction head 81 rotating with and preferably being integral with the bevel gear 80 as illustrated. The friction head 81 engages a friction disc 82 which is fast on a sleeve 83 surrounding the shaft 75. The end of the sleeve 83 at the left, as viewed in Fig. 2, is provided with a clutch member 84 which is engaged by a corresponding clutch member 85 on the hand-wheel 77, so that when the hand-wheel is moved to the right, as viewed in Fig. 2, the rotation of the bevel 80 by the bevel 79 will operate through the friction clutch, the sleeve 83, the hand-wheel 77 and the shaft 75, to rotate said shaft and to move the nut 73 horizontally. The friction disc 82 is maintained in frictional engagement with the friction head 81 by a compression spring 86, one end of which engages the friction disc 82, and the opposite end of which engages an adjustable lock nut 87, so that the friction with which the disc 82 engages the friction head 81 may be adjusted.

The controller governing the operation of the motor comprises a shaft 88 which carries a drum on which the moving contacts 91 for the forward direction and 92 for the reverse direction are mounted. These moving contacts engage stationary contacts 90 which are connected respectively to the motor 41, its field 96, and resistance 97 and lines 94, 95. The controller being of a standard type need not be further described. The lever 63 is pivoted at 89 and provided with a gear sector 89$^a$ arranged to operate the controller through the gear 89$^b$. The sector and gear are so arranged that motion of lever 63 in the forward direction from the neutral position indicated in Fig. 6 at once operates the controller, whereas motion of said lever in the reverse direction does not operate the controller until a certain predetermined distance has been traversed. Means for accomplishing this result is shown as comprising a special tooth or member 93 on the gear 89$^a$ which cooperates with a section 93$^a$ of the gear sector 89$^a$ to permit lost motion of the sector with respect to the gear.

In order to describe one application of my invention, I will assume that the engine is being used for towing purposes and that one end of the towing cable or hawser connecting the towing vessel to the vessel being towed is wound upon the drum 14. In order to produce and maintain a desired tension on the cable or hawser, the hand-wheel is rotated a desired amount, it being understood that each revolution of the hand-wheel 77, with a corresponding movement of the nut 73, to the right, corresponds to a certain amount of tension in the cable or hawser. The operator thus rotates the hand-wheel 77 the desired amount to set up in the cable or hawser the tension which it is desired should be produced, and the hand-wheel is then moved to the right to bring into play the automatic mechanism heretofore described. The rotation of the hand-wheel brings the controller into the forward position and causes the motor to rotate through the spur gears, the worm, and the worm wheel, the drum in the direction to haul in the cable. As soon as tension is set up in the cable, the worm wheel 17 acts against the worm 18 to move the shaft 19 to the right against the action of the spring 29. At the same time, the movement of the shaft 19 to the right causes the end of the shaft, which is pivoted at 98 to an arm 99 on the shaft 70, to rotate the arm 99 clockwise, thereby rotating the shaft 70 which in turn rotates the arm 69, which is also secured on the shaft, clockwise and moves the pivot 68 to the right, thereby rotating the floating lever 67 about its intermediate pivot point and moving the pivotal point 66 at the opposite end of the lever to the left, thereby tending to bring the controller back toward its normal intermediate position. As the rotation of the motor continues and the tension on the cable increases, the controller is similarly moved farther to the left until when the spring 29 is compressed sufficiently to correspond to the desired tension on the cable, the controller is brought back to its normal intermediate position. Assume, for example, that this tension is 20,000 pounds. With the shaft 19 in the normal position which it assumes with the stated tension on the cable, and correspondingly the piston valve member 50 which is caused to follow the movement of the shaft 19 because of the action of the spring 58, the port 54 is blanked, and the worm wheel 17 connected to the drum cannot rotate the worm 18, because of the fact that the oil brake is now brought into operation and prevents movement of the drum in a direction to pay out the cable. In accordance with my invention in its preferred form, the tension on the cable can increase to a considerable extent without paying out the cable. This result is accomplished by providing lost motion between the operating arm 63 and the controller, and by providing sufficient clearance between the opening 56 in the piston valve member and the port 54 in the valve liner. When the tension on the cable has reached the danger point, however, and this danger point usually corresponds to the safe working stress of the material of which the cable is formed, the shaft 19 is moved to the right to such an extent that the opening 56 in the piston valve registers with the port 54, thereby opening a by-pass around the oil durm and permitting the cable to pay out, and relieve the tension and thus avoid injury to the cable. At the same time, or approximately the same time the controller moves to bring the "reverse" contacts into engagement with the stationary contacts to close a circuit to the motor to cause it to rotate in a direction to pay out cable, and thus supplement the action of the by-pass for the oil brake. For example, when the normal tension on the cable is 20,000 pounds, the danger point may be represented by a tension of 30,000 and it would be this tension which causes the shaft 19 to be moved to the right sufficiently to open the by-pass referred to.

When it is desired to pay out cable, and the automatic mechanism is not operative, as for example, when the cable is wound on the drum and it is desired to pay out light line, the operator actuates the lever 61 to move the piston valve 50 to the left as viewed in Fig. 2, and thus open a by-pass around the valve 49, through the ports 54 and 55 and around the end of the piston valve member 50.

In case the cable slackens, the shaft 19 is moved to the left, as viewed in Fig. 2, thereby operating through the described connections to move the controller to the forward position, thereby winding in the cable and taking up the slack, it being recalled that the oil in the brake circulates freely when the cable is being wound in.

I claim:

1. In a winding engine, a winding drum for the cable, driving means for said drum comprising a rotatable longitudinally movable member, yielding means associated with said member for resisting the movement thereof and responsive to normal tension on the cable for resisting rotation of said member in one direction and operable on a further increase in tension on the cable for permitting rotation of said member.

2. In a winding engine, a winding drum for the cable, driving means for said drum comprising a longitudinally movable shaft, yielding means resisting the movement of said shaft, and means associated with said shaft and responsive to normal tension on the cable for resisting rotation of said drum in one direction and operable on a further increase in tension on the cable for permitting rotation of said shaft.

3. In a winding engine, a winding drum for the cable, driving means for said drum comprising a longitudinally movable shaft, yielding means resisting the movement of said shaft, and an oil brake associated with said shaft and responsive to normal tension on the cable for resisting rotation of said drum in one direction and operable on a further increase in tension on the cable for permitting rotation of said shaft.

4. In a winding engine, a winding drum, a cable therefor, meshing gears to drive said drum, a fluid brake to oppose the payout of said cable associated with said gears, a yielding device comprising a member moving to and fro responsive to changes in tension in the cable, a valve associated with said member whereby when the tension is below normal the valve is opened, the brake operating with reduced resistance, and when the tension is above normal the valve is partly closed to offer increased resistance.

5. In an automatic towing winch a tension governor therefor, an electric motor and meshing gears to drive a winding drum on said winch, a cable on said drum, and a fluid brake associated with said meshing gears and operable under control of said tension governor to offer decreased resistance when the cable is paid out under increased tension and to offer increased resistance when the cable is paid out under decreased tension.

6. In a winding engine, a winding drum for the cable, a worm wheel rotatable with said drum, a longitudinally movable shaft provided with a worm engaging said worm wheel, yielding means resisting the longitudinal movement of said shaft, a motor for rotating said drum through said worm and worm wheel, and means associated with said shaft and responsive to normal tension on the cable for resisting rotation of said drum in one direction and operable on a further increase in tension on the cable for permitting rotation of said shaft.

7. In a winding engine, a winding drum for the cable, a worm wheel rotatable with said drum, a longitudinally movable shaft provided with a worm engaging said worm wheel, yielding means resisting the longitudinal movement of said shaft, a motor for rotating said drum through said worm and worm wheel, and means associated with said shaft and responsive to normal tension on the cable for resisting rotation of said drum in one direction and operable on a further increase in tension on the cable for permitting rotation of said shaft, the parts being constructed and arranged to permit rotation of said shaft in the opposite direction.

8. In a winding engine, a winding drum for the cable, a worm wheel rotatable with said drum, a longitudinally movable shaft provided with a worm engaging said worm wheel, yielding means resisting the longitudinal movement of said shaft, meshing spur gears, a motor and its operating shaft connected to said spur gears, said spur gears being mounted on the said shafts, said spur gears forming part of a fluid brake for resisting the movement of said drum in one direction only, and means responsive to a predetermined longitudinal movement of said shaft for rendering ineffective said brake for resisting rotation of said shaft.

9. In a winding engine, a winding drum for the cable, a worm wheel rotatable with said drum, a longitudinally movable shaft provide with a worm engaging said worm wheel, yielding means resisting the longitudinal movement of said shaft, meshing spur gears, a motor and its operating shaft connected to said spur gears, said spur gears being mounted on the said shafts, and a fluid brake of which said gears form the fluid propulsion members for resisting the rotation of said worm shaft in one direction only, and means responsive to a predetermined longitudinal movement of said shaft for rendering ineffective said brake for resisting rotation of said shaft.

10. In a winding engine, a winding drum for the cable, a worm wheel rotatable with said drum, a longitudinally movable shaft provided with a worm engaging said worm wheel, yielding means resisting the longitudinal movement of said shaft, meshing spur gears, a motor and its operating shaft connected to said spur gears, said spur gears being mounted on the said shafts, and a fluid brake of which said gears form the fluid propulsion members and comprising a valve operative to choke the flow of fluid during the rotation of said shaft in one direction and to permit free circulation of said fluid during rotation of said worm shaft in the opposite direction, and means responsive to a predetermined longitudinal movement of said shaft for rendering ineffective said brake for resisting rotation of said shaft.

11. In a winding engine, a winding drum for the cable, a worm wheel rotatable with said drum, a longitudinally movable shaft provided with a worm engaging said worm wheel, meshing spur gears, an operating motor and its shaft connected to said spur gears mounted on the respective shafts for transmitting movement from the motor to the drum, and a fluid brake provided with a passage in which the fluid may circulate, and a one-way valve controlling the circulation of fluid in said passage, said spur gears serving as propulsion members for propelling fluid through said passage, whereby the fluid brake offers resistance to the rotation of said spur gears in one direction of rotation and permits rotation thereof in the opposite direction of rotation.

12. In a winding engine, a winding drum for the cable, a worm wheel rotatable with said drum, a longitudinally movable shaft provided with a worm engaging said worm wheel, means for yieldingly resisting the longitudinal movement of said shaft in the outhauling direction of said drum, a motor for rotating said drum through said worm and gear, means for resisting the rotation of said shaft in the outhauling direction of said drum and with normal tension on the cable, means responsive to a further predetermined increase in tension on said cable for rendering said resisting means ineffective, a controller for the motor having forward and reverse contacts, means responsive to the longitudinal movement of said shaft against the yielding resisting means for moving said controller towards the reverse position, a predetermined movement of the controller being permitted between its normal position and its engagement with the reverse contacts, whereby increase in tension above normal may occur in the cable without energizing the motor.

THOMAS SPENCER MILLER.